US012715431B1

(12) United States Patent
Wallner

(10) Patent No.: US 12,715,431 B1
(45) **Date of Patent: *Aug. 25, 2026**

(54) AUTONOMOUS VEHICLE ENTITY VECTOR-BASED SITUATIONAL AWARENESS SCORING MATRIX

(71) Applicant: United Services Automobile Association (USAA), San Antonio, TX (US)

(72) Inventor: Richard John Wallner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,069

(22) Filed: Oct. 28, 2024

Related U.S. Application Data

(63) Continuation of application No. 17/482,969, filed on Sep. 23, 2021, now Pat. No. 12,179,752, which is a (Continued)

(51) Int. Cl.

*B60W 30/095* (2012.01)
*B60W 40/09* (2012.01)
*B60W 50/10* (2012.01)
*G05D 1/00* (2024.01)
*G08G 1/16* (2006.01)

(52) U.S. Cl.

CPC ........ *B60W 30/0956* (2013.01); *B60W 40/09* (2013.01); *B60W 50/10* (2013.01); *G05D 1/0088* (2013.01); *G08G 1/166* (2013.01); *G08G 1/167* (2013.01)

(58) Field of Classification Search

CPC ...................... B60W 50/10; G05D 2201/0213
See application file for complete search history.

(56) References Cited

U.S. PATENT DOCUMENTS

2008/0309468 A1* 12/2008 Greene .................. G08G 1/166 340/436
2012/0065871 A1* 3/2012 Deshpande .......... G08G 1/0133 701/118

(Continued)

*Primary Examiner* — Peter D Nolan
*Assistant Examiner* — Ce Li Li
(74) *Attorney, Agent, or Firm* — BakerHostetler

(57) ABSTRACT

A method comprises steps including detecting, while piloting a route to a destination location, a plurality of road entities; assigning each of the plurality of road entities a provisional unique identifier; receiving an indication from an external source of at least one certified object identifier associated respectively with at least one of the plurality of provisional unique identifiers, wherein the at least one certified object identifier respectively indicates at least one of the plurality of the road entities to the vehicle and the external source, wherein the at least one certified object identifier is configured to be shared among a plurality of vehicles using peer-to-peer wireless communication; receiving external information associated with one or more of the at least one certified object identifier; and determining, based upon a collision risk presented by the plurality of road entities to an autonomous vehicle, accident avoidance and mitigation calculations.

20 Claims, 5 Drawing Sheets

Related U.S. Application Data continuation of application No. 15/835,706, filed on Dec. 8, 2017, now Pat. No. 11,155,260.

(60) Provisional application No. 62/432,034, filed on Dec. 9, 2016.

(56) References Cited

U.S. PATENT DOCUMENTS

| | | | | |
|---|---|---|---|---|
| 2014/0032049 | A1* | 1/2014 | Moshchuk | G08G 1/166<br>701/42 |
| 2014/0222278 | A1* | 8/2014 | Fujita | B60W 30/09<br>701/25 |
| 2015/0151751 | A1* | 6/2015 | Clarke | B60T 13/662<br>701/28 |
| 2018/0144369 | A1* | 5/2018 | Pouliot | B60W 30/0956 |
| 2019/0138007 | A1* | 5/2019 | Baghsorkhi | G08G 1/16 |

* cited by examiner

FIG. 1A

| LEVEL | NAME | NARRATIVE DEFINITION | EXECUTION OF STEERING AND ACCELERATION/ DECELERATION | MONITORING OF DRIVING ENVIRONMENT | FALLBACK PERFORMANCE OF DYNAMIC DRIVING TASK | SYSTEM CAPABILITY (DRIVING MODES) | BASt LEVEL | NHTSA LEVEL |
|---|---|---|---|---|---|---|---|---|
| *HUMAN DRIVER* MONITORS DRIVING ENVIRONMENT | | | | | | | | |
| 0 | NO AUTOMATION | THE FULL-TIME PERFORMANCE BY THE *HUMAN DRIVER* OF ALL ASPECTS OF THE *DYNAMIC DRIVING TASK*, EVEN WHEN ENHANCED BY WARNING OR INTERVENTION SYSTEMS | HUMAN DRIVER | HUMAN DRIVER | HUMAN DRIVER | N/A | DRIVER ONLY | 0 |
| 1 | DRIVER ASSISTANCE | THE *DRIVING MODE*-SPECIFIC EXECUTION BY A DRIVER ASSISTANCE SYSTEM OF EITHER STEERING OR ACCELERATION/DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | HUMAN DRIVER AND SYSTEM | HUMAN DRIVER | HUMAN DRIVER | SOME DRIVING MODES | ASSISTED | 1 |

FIG. 1B

| | | | | | | | | |
|---|---|---|---|---|---|---|---|---|
| 2 | PARTIAL AUTOMATION | THE *DRIVING MODE*-SPECIFIC EXECUTION BY ONE OR MORE DRIVER ASSISTANCE SYSTEMS OF BOTH STEERING AND ACCELERATION/ DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | SYSTEM | HUMAN DRIVER | HUMAN DRIVER | SOME DRIVING MODES | PARTIALLY AUTOMATED | 2 |
| *AUTOMATED DRIVING SYSTEM* ("SYSTEM") MONITORS THE DRIVING ENVIRONMENT | | | | | | | | |
| 3 | CONDITIONAL AUTOMATION | THE *DRIVING MODE*-SPECIFIC PERFORMANCE BY AN *AUTOMATED DRIVING SYSTEM* OF ALL ASPECTS OF THE *DYNAMIC DRIVING TASK* WITH THE EXPECTATION THAT THE *HUMAN DRIVER* WILL RESPOND APPROPRIATELY TO A *REQUEST TO INTERVENE* | SYSTEM | SYSTEM | HUMAN DRIVER | SOME DRIVING MODES | HIGHLY AUTOMATED | 3 |

FIG. 1C

| | | | | | | | | |
|---|---|---|---|---|---|---|---|---|
| 4 | HIGH AUTOMATION | THE *DRIVING MODE*-SPECIFIC PERFORMANCE BY AN *AUTOMATED DRIVING SYSTEM* OF ALL ASPECTS OF THE *DYNAMIC DRIVING TASK*, EVEN IF A *HUMAN DRIVER* DOES NOT RESPOND APPROPRIATELY TO A *REQUEST TO INTERVENE* | SYSTEM | SYSTEM | SYSTEM | SOME DRIVING MODES | FULLY AUTOMATED | 3/4 |
| 5 | FULL AUTOMATION | THE FULL TIME PERFORMANCE BY AN *AUTOMATED DRIVING SYSTEM* OF ALL ASPECTS OF THE *DYNAMIC DRIVING TASK* UNDER ALL ROADWAY AND ENVIRONMENTAL CONDITIONS THAT CAN BE MANAGED BY A *HUMAN DRIVER* | SYSTEM | SYSTEM | SYSTEM | ALL DRIVING MODES | | |

10
18
16
14
44
38
ROAD SIGNS
44
TRAFFIC LIGHT
36
12
20
56
18
22
26
55
50
53
42
34
43
52
40
30
35
32
24
28
12

100

102
PROVIDE A GUI FOR A USER TO ENTER A ROUTE OR DESTINATION
104
CALCULATE ROUTE
106
PI LOT HOST VEHICLE ALONG THE ROUTE
108
CONTINUOUSLY DETECTING OTHER ROAD ENTITIES
110
DETERMINE SPEED, DIRECTION BEHAVIOR OF OTHER ROAD ENTITIES
SCORING OTHER ROAD ENTITIES BASED ON COLLISION RISKS
112
DEDICATING PROCESSOR RESOURSES FOR CALCULATING ACCIDENT MIT/AVOID. BASED ON SCORING
114

AUTONOMOUS VEHICLE ENTITY VECTOR-BASED SITUATIONAL AWARENESS SCORING MATRIX

CROSS-REFERENCE TO RELATED APPLICATIONS

This application is a continuation of U.S. patent application Ser. No. 17/482,969, filed Sep. 23, 2021, which is a continuation of U.S. patent application Ser. No. 15/835,706 (now U.S. Pat. No. 11,155,260) filed Dec. 8, 2017 (issued Oct. 26, 2021) and which claims the benefit of the filing date of U.S. Provisional Patent Application No. 62/432,034 filed Dec. 9, 2016, and is incorporated herein by reference.

FIELD OF THE INVENTION

The present invention provides a system and method for providing an autonomous vehicle core operating system the ability to assess and score all entities registered by an on-board sensor grid, and also network feeds from a centralized or ad hoc traffic resources with an index to symbolize the value of importance with respect to the autonomous vehicle and its occupants.

BACKGROUND

Autonomous driving vehicles are under development by car manufacturers as well as the infrastructure to accommodate them on today's roads. SAE International has developed definitions for six levels of driving automation Levels 0-6 (FIG. 1). Levels 0-2 require a human driver to monitor the driving environment and levels 3-5 require an automated driving system to monitor the driving environment. Vehicles of levels 0-2 are on the road today and have an onboard control system for assisting a driver of a host vehicle in tracking adjacent vehicles. Existing driver assist systems include adaptive cruise control, forward collision warning, lane keeping and lane departure systems, and the like. These systems utilize input from sensors such as RADAR, LIDAR, LASER and optical cameras to track vehicles surrounding the host vehicle. The onboard systems can take measures such as flashing a warning light on the dashboard, side-view or rear-view mirrors, or other display and by applying brakes to slow or stop the host vehicle.

Vehicles of levels 3-5 are being tested on today's roads but are not available for purchase by the general public on a large scale in the United States. In order to ascend to SAE Level 4 and above, a key element must be created to allow for automobiles of all shapes and sizes to freely navigate our highway and road infrastructure. We will experience a gradual blend of varying levels of Autonomous and Non-Autonomous.

The human driver is arguably aware of their immediate surroundings at fleeting intervals, with very narrow perspective of the road environment at any given time. We are full of distractions, and have varying degrees of perception which is filtered once more through our cognitive function which presents further evaluation/modification of our perceived environment.

The system of the present invention intends to mimic and enhance that capability by being able to objectify and track these objects utilizing onboard sensors and also externally provided sensor information via a governing transit authority feed, or local area feeds from other vehicles broadcasting information.

The system of the present invention will perform this tracking and prioritization of all road elements in course of a vehicle's journey.

SUMMARY

The present invention provides a vector based awareness matrix or system for mimicking a human driver situational awareness and providing input to an onboard autonomous control.

Aspects herein can concern methods that in embodiments comprise: detecting, while piloting a route to a destination location using an autonomous vehicle, a plurality of road entities; assigning, by the autonomous vehicle, each of the plurality of road entities a provisional unique identifier, wherein a plurality of provisional unique identifiers comprises each provisional unique identifier; receiving an indication from an external source of at least one certified object identifier associated respectively with at least one of the plurality of provisional unique identifiers, wherein the at least one certified object identifier respectively indicates at least one of the plurality of the road entities to the vehicle and the external source, wherein the at least one certified object identifier is configured to be shared among a plurality of vehicles using peer-to-peer wireless communication; receiving, from at least one of the plurality of vehicles and using peer-to-peer wireless communication, external information associated with one or more of the at least one certified object identifier; determining, based upon a collision risk presented by the plurality of road entities to an autonomous vehicle, accident avoidance and mitigation calculations with respect to each road entity of the plurality of road entities; and piloting, based on the accident avoidance and mitigation calculations, the autonomous vehicle to a destination location.

The system further includes a centralized traffic resource external from the onboard system and capable of generating and transmitting a signal representative of road conditions in a large geographical area including in the vicinity of the host vehicle and of receiving signals representative of road conditions in the vicinity of the host vehicle transmitted by the host vehicle. The system is capable of determining and tracking over time the type of entity, speed, direction and behavior of each of the other road entities. The host vehicle is capable of transmitting a signal representative of the road conditions of the host vehicle to the other road entities and of receiving signals from other autonomously driven vehicles in the vicinity of the host vehicle.

The sensor array of the system includes at least one of a RADAR, a LIDAR, a LASER, an accelerometer, and a camera. The system is capable of transmitting a warning signal upon the detection of a pedestrian in a vicinity of the host vehicle. The system is capable of determining the route based on traffic condition data received from the external centralized traffic resource and wherein the step of piloting the host vehicle includes controlling the speed and direction of the host vehicle, responding appropriately to traffic lights and avoiding collisions with the other road entities.

The aspects described in this summary provide examples of some aspects of the disclosure, and do not in any way constrain the scope or spirit of the disclosure, or limit or instruct interpretation of the claims, in any way.

BRIEF DESCRIPTION OF THE DRAWINGS

To understand the present invention, it will now be described by way of example, with reference to the accompanying drawings and attachments in which:

FIG. 1A, FIG. 1B, and FIG. 1C are a table entitled a Summary of Levels of Driving Automation for On-road Vehicles.

Figure 2:
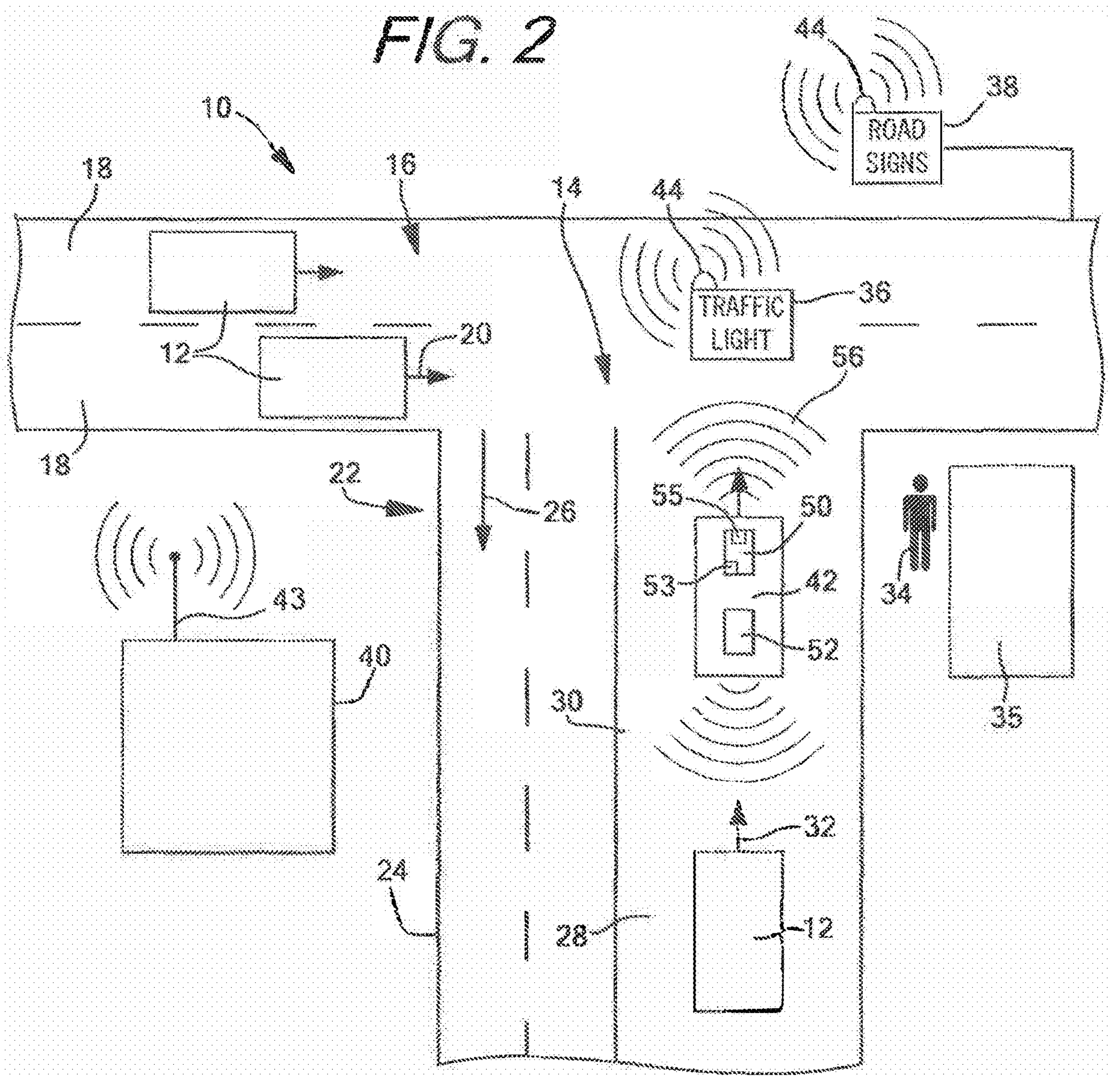
FIG. 2 is a schematic representation of a system of the present invention.

These brief descriptions of the drawings are intended to introduce a subset of concepts relating to the drawings and should not be interpreted to limit the scope or spirit of the disclosure or claims in any way.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a Summary of Levels of Driving Automation for On-Road Vehicles. In levels 0-2 a human operator is responsible for monitoring the driving environment (road conditions). In levels 3-5, an automated driving system monitors the driving environment. The present invention provides an on-board system for an autonomous driving vehicle, and more preferably, an autonomous on-road vehicle of SAE levels 3-5, for piloting the vehicle and avoiding collisions with other road entities. The invention provides a method of dedicating proportionate processor resources for collision avoidance and mitigation calculations based on the risk presented by the other road entity.

FIG. 2 shows a representation of traffic conditions in the vicinity of a host vehicle 42 generated by a processor of an onboard system using inputs from an onboard sensor array and signal received from external inputs such as GPS and from a centralized traffic resource 40. The vicinity is an area comprising an intersection 14 of a one-way street 16 having two lanes 18 for traffic going in a first direction 20. The one-way street 16 intersects with a second two-way street 22 having four lanes. Two lanes 24 are to accommodate on-road vehicles proceeding in a second direction 26 and two lanes 28, separated by a line 30, for on-road vehicles proceeding in a third direction 32 opposite of the second direction. The second and third directions are generally perpendicular to the first direction but could be at a different angle of greater or less than 90° so long as it is in a direction transverse (i.e., in a line to intersect) thereto and coplanar therewith.

FIG. 2 further shows a pedestrian 34 standing in lane 28 next to an on-road vehicle. The intersection has a traffic light 36 and a road sign 38. The intersection 14 is within a range of electronic transmission of a centralized traffic resource 40 that has a transmitter 43 for sending signals representative of road conditions and for receiving signals from autonomous on-road vehicles 42. The centralized traffic resource 40 is in electronic communication with an array of sensors such as in-road sensors for detecting the speed and direction of vehicles, and the volume of vehicle traffic. The centralized traffic resource 40 can also receive electronic transmissions from beacons 44 on road signs, traffic lights and mounted on other structures and from other sources. The centralized traffic resource can also detect or receive signals representative of the ambient conditions in the vicinity such as the weather and lighting conditions.

The autonomous on-road vehicle 42 (host vehicle) has an onboard system 50 electronically connected to a sensor array 52 on the host vehicle 35. The system 50 has a controller 53 with a processor, a memory and software stored in the memory when executed by the processor generates a digital representation of the road conditions (FIG. 2), and transmits the signal to receiving entities such as other road entities and the centralized traffic resource 40. The sensor array includes at least one, and preferably all, of a RADAR, a LIDAR, a LASER, an accelerometer, and a camera. The sensors of the sensor array are mounted to the host vehicle and can generate and transmit signals representative of the data gathered to the controller for the purposes just mentioned.

The system 50 is a software module that provides input to an onboard autonomous vehicle core software system that is responsible for controlling driving attributes such as the speed, or the speed and direction, of the host vehicle, and, in some instances for safely navigating from a departure location to a desired destination location. The system can utilize locally gathered data through an onboard sensor array and external sources such as GPS or other broadcasting system or entity.

Information Sharing by the System

The federal government recently released its requirements for standardization of a vehicle data sharing capability of all autonomous vehicle entities. As a result, we will find that our vehicles are very social and communicative over the dedicated traffic channels. The system of the present invention is greatly enhanced with the utilization of these communication methods, but is able to function independently in a non-autonomous or blended environment.

There are different communications channels and channel modes for this data sharing, including vehicle to vehicle, local area receipt/broadcast, system alert notification receipt/broadcast, and critical emergent alert notification. Discrete Peer-to-Peer (Vehicle to Vehicle) channel can use the following channel modes: (1) Prompt/Response (Request, Acknowledgement), (2) Handshake, (3) Action Consent/Consensus, (4) Continuous Feed (Positional, Risk Assessment), (5) Courtesy Area Departure (Notification of intent to end link), and (6) Disconnect (Abrupt, Graceful and Other).

The Local Area Receipt/Broadcast channel can use the following channel modes: (1) Wider Area Prompt, (2) Wider Area Response, (3) Traffic mitigation for encounter guidance with transition to Discrete Peer-to-Peer, (4) Entity Map Object Discovery and Reconciliation Receipt/Response (Who is, What is, Where is Entity validation using one or more external sources).

The System Alert Notification Receipt/Broadcast channel can use the following channel modes: (1) Continuous Vehicle Intention and Vehicle State Update (Real time and 5 Second Lead) (Where I Am Now, Where I Will Be, My Health Stat), (2) Entity Map System List/Roster (3) Traffic Conditions Receipt (Accident, hazard, immediate risk broadcast), (4) Traffic Conditions Update (Accident, hazard, immediate risk broadcast), and (5) State/City Alert Information.

The Critical Emergent Alert Notification channel can use the following channel modes: (1) Priority Emergency Vehicle Receipt, (2) Vehicle Distress Emergency Declaration (tire blowout, mechanical breakdown, occupancy emergency, critical system failure, etc.); (3) Amber/Silver Alert Receipt/Broadcast, and (4) State/City Emergency Receipt.

The system of the present invention will gather data continuously during a trip. The system will continuously poll the sensor grid for entities to identify as objects of concern, and assign them a provisional unique identifier object id. This object id may remain provisional unless ratified by other external sources, or Certified Object ID is shared. So in a completely isolated non-autonomous environment, the system will be aware of the various elements around it and address those elements with provisional identifiers that may persist in the system for what could be an entire journey.

The system will interact with other autonomous vehicles, and also government provided sensors and traffic resources to establish a “known” and shared object ID for any other element. The system will prepare an External Entity Encounter table that will include a field for Provisional Object ID, and Certified Object ID. Much like in secure communications, each autonomous vehicle will retain a form of token/certificate very similar to x509 Public Key Infrastructure (PKI), perhaps an x509AVE (Autonomous Vehicle Entity) Certificate designation.

Within this certificate is the “known as” or Certified Object ID which can be shareable and broadcast, and used to address the vehicle.

One example to demonstrate this is where autonomous vehicles will prompt each other for their Certified Object ID upon encounter in the Discrete Peer-to-Peer communication channel. This Information will propagate across the local area, and autonomous vehicles will be on a first-name-basis as authenticated autonomous entities. Every vehicle will update their Certified Object ID record for that particular entity in the local group, and communications between vehicles will utilize that secure layer to exchange information.

This is also essential for Entity validation requests among groups to continuously eliminate “Ghosts” in the traffic dataflow, and properly discern ghost entities, from actual Non-Autonomous/Non-verbose entities sharing the road in a blended environment.

The system will also continuously process information that it gathers. For example, in an initial vehicle encounter, the system will: (1) addExternalEntity( )—Provisional Object ID establish; (2) getEntityInfo( )—Initialize Population of Entity Properties: Type, Positional, Delta-V in relation to the host vehicle, Risk Assessment Metrics; (3) updateEntityInfo( )—Interval Update of Entity Properties: Positional, Delta-V irSys, Risk Assessment Metrics (4) getExternalEntityID( )—Peer to Peer obtaining of Certified Object ID; and (5) getBroadcastEntityList( )—System Notification EntityList in local area with Positional and Entity State for Xref against Provisional/Certified Object ID.

The system will also continuously make risk assessments including determining the type of entity being encountered (evalEntityType( )). This includes determining what type of vehicle/object is being sensed based on sensor information. On-road vehicles come in many shapes and sizes and include, for example a: Small car, Medium car, Large car, Motorcycle, Bicycle, Pedestrian, Large Vehicle, and Oversized Vehicle to name a few. The entity type will be taken into account in estimating the actions of the detected entity including making standard estimates for acceleration, stopping distance, tonnage, curb weight, turning radius, etc.

The system will also continuously make risk assessments including determining the location of the detected entity, estimating where the detected entity will be in 5 seconds using onboard sensors (local), determining where the detected entity will be in 5 seconds based upon data received from external sources (ext), estimate the location of where the host vehicle will be in 5 seconds, determining the direction of the detected entity, determining the behavior of the detected entity, determining the distance from the detected entity, determining the closure rates of the detected vehicle, determine a time where the host vehicle path will intersect with the detected entity path, determine evasive maneuvers or escape vectors, and assign a risk score to the detected entity and based on a ranking of the risk score dedicating processor resources proportionate to the risk with high scores getting greater processor attention than lower risk scores.

The step of determining the location of the detected entity (evalEntityPosLocal( )) utilizes GPS input and input from other onboard sensors. The system will identify and allocate positional data for the detected entity to include GPS location, and location in relation to the host vehicle at any given moment real-time.

The step of determining the location of the detected vehicle using external sources (evalEntityPosExt( )) uses inputs from peer-to-peer networks, a local traffic resource, and from the detected vehicle to name a few.

The system will consume data from the detected entity and store that entity's positional information and perform comparison. If the comparison between where the system believes the entity is located in space-time, and where the entity itself believes it is located are within acceptable variance, then we will flag this as a positional match.

In the step of determining where the detected entity will be in 5 seconds (evalEntityIntentLocal( )), the system will identify and allocate positional data for the detected entity to include GPS location, and location in relation to the system (or host vehicle) at any given moment for at least 5 seconds ahead of time.

In the step of determining where the host vehicle will be in 5 seconds (evalEntityIntenExt( )), similar to the real-time feed, other entities may provide their own 5 second future estimated position. The system will utilize this data from the detected entity and store that entity's positional intent information and perform comparison. If the comparison between where the system believes the entity is located in space-time 5 seconds from now, and where the entity itself believes it is located are within acceptable variance, then we will flag this as a positional match.

In the step of determining the detected entity direction with respect to the host vehicle (evalEntity Vectors( )) utilizes input from any combination of onboard sensors and data from external sources.

In the step of determining a behavior of a detected entity (evalEntityBehavior( )) utilizes data to the acceleration, braking, changing direction, lane usage, and velocity, to name a few examples. Each detected entity will exhibit various driving attitudes that can be assessed in real-time by the local group of autonomous vehicles. These behaviors can be categorized as enumerations in a set of known behavioral qualities and the system will set status to match the type of behavior of the vehicle exhibited in real-time. For most part, the system will record other entities as “Stable”.

In the step of determining the distance from the host vehicle to the detected entity (evalEntityFieldSeparation( )) includes detecting the gap distance from the detected entity. Acceptable gaps for traffic quality management can be prescribed and if gaps are decreased beyond those standards, the system can raise a concern.

In the step of calculating a closure rate (evalEntityVectorClosure( )) of the detected entity to the host vehicle the detected rate is compared to an ideal rate or range, and if an acceptable threshold is crossed in closure rate, the system will register a concern for the Risk Assessment to evaluate.

In the step of determining a time of crossing paths of the host vehicle with the detected (evalEntityVectorIntersect( )) entity utilizes a time indexed calculation to determine whether the projected route of the host vehicle will intersect with a projected path of the detected entity.

In the step of determining potential escape vectors (evalEscapeVectorOpts( )), the system will provide recommendations to the driver control system to avoid violent rear impact, side impact, front impact based upon closure rate, and intersection estimates.

In the step of determining a risk score (EntityRiskScore( )) utilizes input from the onboard sensors and from external sources and the behavior of the detected entity. This is the result of a risk assessment methodology. Each detected entity will receive an appropriate score for the system to evaluate and assign processor resources based on the higher risk vehicles when compared to lower risk vehicles.

Being able to perform the same assessment of real-time conditions, and also time-shift 5 seconds ahead with the same calculations will give the system the ability to navigate and be ready for potential developing situations that may be of adverse impact.

Figure 3:
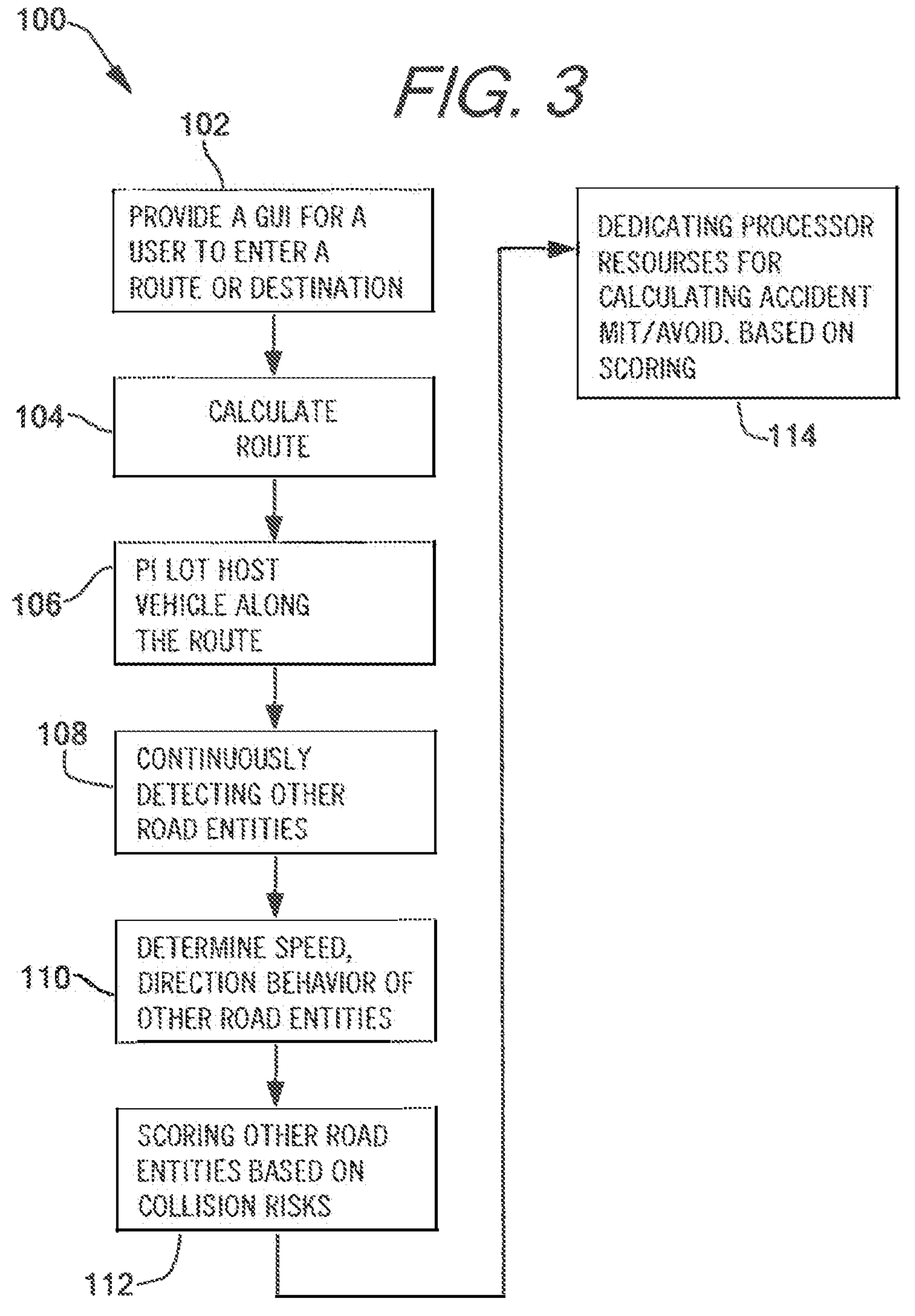
FIG. 3 is a flowchart of a method of the present invention.

In one example, the present system 50 can be used onboard a host vehicle and provide an input to an autonomous vehicle core system responsible for controlling the speed and direction of the host vehicle and for piloting the host vehicle safely on existing streets from a departure location to a desired destination location entered by an occupant of the host vehicle. The autonomous vehicle core software system is provided onboard the vehicle by the auto manufacturer. The system 50 and the autonomous vehicle core system (combined systems) when executed by the processor takes the steps shown in the flowchart 100 of FIG. 3. Namely, in step 102 the combined systems provide a graphical user interface (GUI) for a user to input a destination location. In step 104, a route is calculated using the processor from the starting location to the destination location. The starting location can be determined using GPS, for example.

In step 106, the combined system pilots the host vehicle on the route at an appropriate speed and direction and in the proper road and lane and taking into consideration the road conditions safely to the destination location. During the trip, the combined systems, in step 108, continuously detects the presence of other road entities including wheeled vehicles, traffic signs, traffic lights, and pedestrians to name a few. The combined system in step 110, using the processor and input from the sensor array, also tracks the location, speed, direction and behavior of the other road entities. Behavior includes a driver's actions over a period of time and can include characteristics such as the vehicle is moving at a rate in excess of the posted rate, the vehicle is changing lanes rapidly, the vehicle is changing the rate of speed rapidly, the vehicle is moving at a rate of speed below the posted limit, etc.

The controller can also calculate a difference in velocity of the host vehicle with respect to an adjacent vehicle to determine a closure rate. Based on this information the system, using the processor, calculates a score for each of the other road entities based upon a collision risk it presents to the host vehicle. The greater the collision risk, the higher the score. In step 114 the combined systems dedicate processor resources in proportion to the score. The higher the score the greater the processor resources are dedicated to collision and mitigation calculations.

The present invention also provides a method for piloting a host autonomous vehicle with an electronic system onboard including the steps of: (1) providing a sensor array on the host vehicle for detecting the presence of other road entities in a vicinity of the host vehicle; (2) providing a server electronically coupled to the sensor array and having a processor, and a memory storing computer-readable instructions; (3) generating with the processor a graphical user interface having a field for a user to enter a destination location; (4) calculating a route to be taken along roads from a starting location to the destination location; (5) piloting the host vehicle on the route at an appropriate speed and direction; (6) determining the speed, direction and behavior of each of the other road entities; (7) scoring each of the other road entities based upon a collision risk it presents to the host vehicle and ranking the other road entities from highest risk of collision score to lowest risk of collision score; and (8) utilizing the processor in proportion to the score to perform accident avoidance and mitigation calculations with respect to each of the other road entities.

Many modifications and variations of the present invention are possible in light of the above teachings. It is, therefore, to be understood within the scope of the appended claims the invention may be protected otherwise than as specifically described.

The invention claimed is:

1. A method comprising:

detecting, while piloting a route to a destination location using an autonomous vehicle, a plurality of road entities;

assigning, by the autonomous vehicle, each of the plurality of road entities a provisional unique identifier, wherein a plurality of provisional unique identifiers comprises each provisional unique identifier;

receiving an indication from an external source of at least one certified object identifier associated respectively with at least one of the plurality of provisional unique identifiers, wherein the at least one certified object identifier respectively indicates at least one of the plurality of the road entities to the vehicle and the external source, wherein the at least one certified object identifier is configured to be shared among a plurality of vehicles using peer-to-peer wireless communication;

receiving, from at least one of the plurality of vehicles and using peer-to-peer wireless communication, external information associated with one or more of the at least one certified object identifier;

determining, based upon a collision risk presented by the plurality of road entities to an autonomous vehicle, accident avoidance and mitigation calculations with respect to each road entity of the plurality of road entities; and piloting, based on the accident avoidance and mitigation calculations, the autonomous vehicle to a destination location.

2. The method of claim 1, further comprising transmitting a road condition associated with at least one road entity of the plurality of road entities to a centralized traffic resource.

3. The method of claim 1, further comprising determining a type of entity associated with each road entity of the plurality of road entities, wherein a type of entity is associated with estimates for one or more of acceleration, stopping distance, weight, and turning radius, and wherein the collision risk is based on the type.

4. The method of claim 1, wherein the collision risk is based on at least one of speed, direction, or behavior of the each of the other road entities.

5. The method of claim 1, further comprising transmitting a road condition associated with at least one road entity of the plurality of road entities.

6. The method of claim 1, wherein the collision risk is based on at least one of RADAR, LIDAR, LASER, an accelerometer, or a camera.

7. The method of claim 1, wherein at least one road entity of the plurality of road entities comprises a pedestrian; and wherein the method further comprises transmitting a signal to the pedestrian.

8. The method of claim 1, wherein the accident avoidance and mitigation calculations comprise at least one of determining a route of the vehicle, controlling a direction of the vehicle, or controlling a speed of the vehicle.

9. A non-transitory computer-readable medium comprising:

one or more processors; and instructions that, when executed by the one or more processors, causes:

detecting, while piloting a route to a destination location using an autonomous vehicle, a plurality of road entities;

assigning, by the autonomous vehicle, each of the plurality of road entities a provisional unique identifier, wherein a plurality of provisional unique identifiers comprises each provisional unique identifier;

receiving an indication from an external source of at least one certified object identifier associated respectively with at least one of the plurality of provisional unique identifiers, wherein the at least one certified object identifier respectively indicates at least one of the plurality of the road entities to the vehicle and the external source, wherein the at least one certified object identifier is configured to be shared among a plurality of vehicles using peer-to-peer wireless communication;

receiving, from at least one of the plurality of vehicles and using peer-to-peer wireless communication, external information associated with one or more of the at least one certified object identifier;

determining, based upon a collision risk presented by the plurality of road entities to an autonomous vehicle, accident avoidance and mitigation calculations with respect to each road entity of the plurality of road entities; and piloting, based on the accident avoidance and mitigation calculations, the autonomous vehicle to a destination location.

10. The non-transitory computer-readable medium of claim 9, wherein the instructions further cause transmitting a road condition associated with at least one road entity of the plurality of road entities to a centralized traffic resource.

11. The non-transitory computer-readable medium of claim 9, wherein the instructions further cause determining a type of each road entity of the plurality of road entities, wherein a type of entity is associated with estimates for one or more of acceleration, stopping distance, weight, and turning radius, and wherein the collision risk is based on the type.

12. The non-transitory computer-readable medium of claim 9, wherein the collision risk is based on at least one of speed, direction, or behavior of the each of the other road entities.

13. The non-transitory computer-readable medium of claim 9, wherein the instructions further cause transmitting a signal representative of road conditions to at least one of the each of the other road entities.

14. The non-transitory computer-readable medium of claim 9, wherein the collision risk is based on at least one of RADAR, LIDAR, LASER, an accelerometer, or a camera.

15. The non-transitory computer-readable medium of claim 9, wherein at least one road entity of the plurality of road entities comprises a pedestrian; and wherein the instructions further cause transmitting a signal to the pedestrian.

16. A device comprising:

one or more processors; and instructions that, when executed by the one or more processors, causes the device to:

detecting, while piloting a route to a destination location using an autonomous vehicle, a plurality of road entities;

assigning, by the autonomous vehicle, each of the plurality of road entities a provisional unique identifier, wherein a plurality of provisional unique identifiers comprises each provisional unique identifier;

receiving an indication from an external source of at least one certified object identifier associated respectively with at least one of the plurality of provisional unique identifiers, wherein the at least one certified object identifier respectively indicates at least one of the plurality of the road entities to the vehicle and the external source, wherein the at least one certified object identifier is configured to be shared among a plurality of vehicles using peer-to-peer wireless communication;

receiving, from at least one of the plurality of vehicles and using peer-to-peer wireless communication, external information associated with one or more of the at least one certified object identifier;

determine, based upon a collision risk presented by the plurality of road entities to an autonomous vehicle, accident avoidance and mitigation calculations with respect to each road entity of the plurality of road entities; and pilot, based on the accident avoidance and mitigation calculations, the autonomous vehicle to a destination location.

17. The device of claim 16, wherein the instructions further cause the device to transmit a road condition associated with at least one road entity of the plurality of road entities to a centralized traffic resource.

18. The device of claim 16, wherein the instructions further cause the device to determine a type of each road entity among the plurality of road entities, wherein a type of entity is associated with estimates for one or more of acceleration, stopping distance, weight, and turning radius, and wherein the collision risk is based on the type.

19. The device of claim 16, wherein the collision risk is based on at least one of speed, direction, or behavior of each of the road entities.

20. The device of claim 16, wherein the collision risk is based on at least one of RADAR, LIDAR LASER, an accelerometer, or a camera.

* * * * *